Oct. 9, 1956   T. W. WINSTEAD   2,766,365

THERMOPLASTIC FILM HEAT SEALING ELEMENT

Filed June 18, 1952

INVENTOR
THOMAS W. WINSTEAD

BY
ATTORNEYS

United States Patent Office 2,766,365
Patented Oct. 9, 1956

2,766,365

THERMOPLASTIC FILM HEAT SEALING ELEMENT

Thomas W. Winstead, Baltimore, Md., assignor to Hedwin Corporation, Baltimore, Md., a corporation of Maryland Application June 18, 1952, Serial No. 294,247

4 Claims. (Cl. 219—19)

The present invention relates to bonding thermoplastic materials and has particular reference to improved apparatus for heat bonding thermoplastic films and sheeting and a method of forming the bonding apparatus.

The bonding of thermoplastic materials such as films and sheets has been accomplished by heat sealing methods in combination with the use of conventional plastic solvents for softening the surfaces of the thermoplastic materials prior to the application of heat. The use of solvents minimizes control of the permanence and strength of the film bond, as well as the area of the bond, due to the relatively unpredictable bonding action of the solvents upon application of heat to the thermoplastic film. The use of solvents extends the time required for a single bonding operation, and involves the use of additional apparatus. Application of excessive heat to the thermoplastic film must be avoided for it destroys the body of the film. From the standpoint of standardizing the product, the area and strength of the film bond may vary considerably, in spite of the most careful application of the heat sealing mechanisms.

A further disadvantage of most present methods and apparatus for heat bonding thermoplastic film resides in the failure to provide means for preventing undesirable extrusion of the plastic material and resulting distortion of the film surfaces. The bond of the composite thermoplastic article is thus weakened by uncontrolled thinning down of the film and the formation of bubbles adjacent the bond.

In the heat bonding of thermoplastic film, it is desirable that the bonding apparatus presents a flat heating surface of standard dimension against the film surfaces, in order to standardize the bond area and insure formation of a neat, strong bond. With present bonding apparatus, it is the practice to heat the pressure member itself in order to secure and maintain a sufficiently elevated temperature at the bonding point adjacent the thermoplastic film surface. This results in irregular extension of the area of the film bond, and presents difficulties of clean separation of the pressure face of the bonding apparatus and the heated plastic surfaces.

In my Patent No. 2,481,554, dated September 13, 1949, and in my Patent No. 2,606,987, dated August 12, 1952, I have disclosed impulse heat sealing apparatus including means for confining the bonding heat to a restricted area and preventing undesirable extrusion of material which weakens the bond formed. The formation of such thermoplastic bonds has heretofore been virtually impossible with a hot-bar sealer in which the heat is constant and the tendency has been to develop electronic sealing apparatus which, while eliminating certain problems such as cooling, undesirable extrusion of the plastic film, etc., are rather complex and of greater cost, etc.

Accordingly, the chief object of the present invention is to provide an improved heat sealing apparatus and method of forming the same which will obviate the above-named disadvantages.

Another important object of the present invention is to provide an improved hot-bar sealer which is simple and inexpensive and yet efficient in the heat bonding of thermoplastic film and sheeting of all types.

A further object is to provide an apparatus for the heat bonding of thermoplastic film which is practically instantaneous in operation, producing a film bond of considerable strength and standard dimension, free from extrusion of plastic material adjacent the bond area and free from film weakness resulting from thinning down of portions of the thermoplastic film strips.

A further object of the invention is to provide a novel method of manufacture of an apparatus for use in the heat bonding of thermoplastic film.

Another object of the invention is to provide a hot-bar sealer for the sealing of thermoplastic films which permits a very rapid heating of the contacting surfaces and includes a perfectly flat heating surface for application through a buffer sheet against the thermoplastic film substantially in the plane of the surface of the pressure member, retaining the heat softened plastic on the film surface in the area of the bond.

Other objects and advantages of the invention will become apparent during the course of the following description.

In the drawings, I have shown one embodiment of the invention. In this showing:

Figure 1:
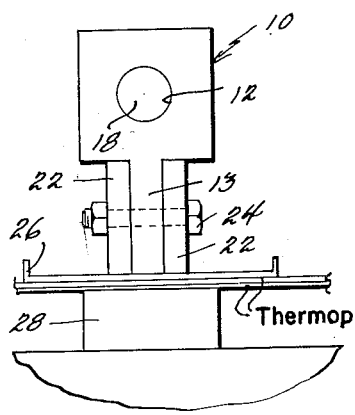
Figure 1 is a view in end elevation of the hot-bar sealing apparatus comprising the present invention and showing the bar and its buffer sheet in bonding position on thermoplastic sheets.
Figure 2:
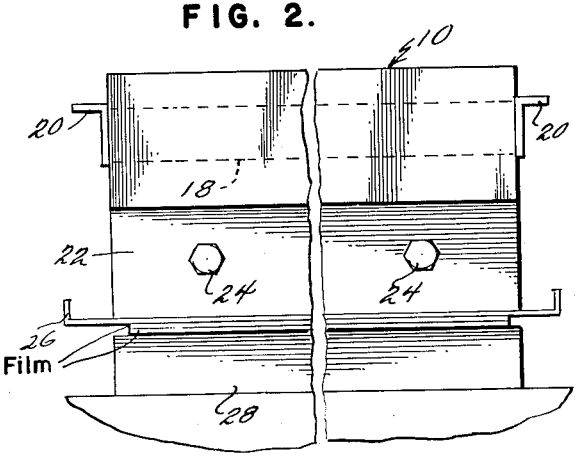
Figure 2 is a side elevational view thereof.
Figure 3:
Figure 4:
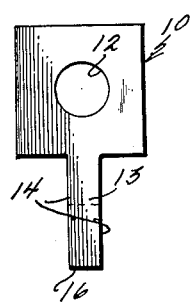
Figure 5:
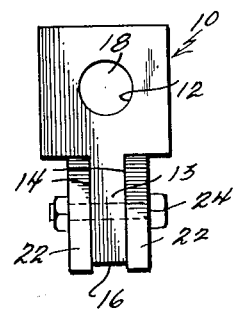
Figure 6:
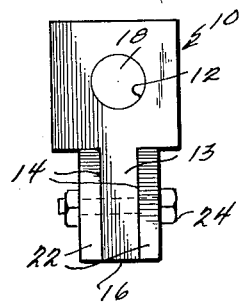
Figure 7:
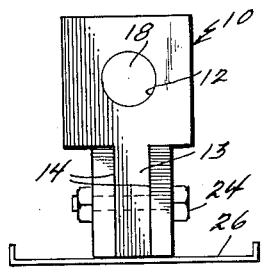

Figures 3–7 inclusive are end elevational views disclosing the various steps in the formation of the improved hot-bar comprising the present invention.

Referring to the drawings, numeral 10 designates the hot-bar as a whole which comprises an elongated bar, the upper portion of which includes a longitudinally extending bore 12. The sides of the bar are rabbeted as by machining operations, such as milling, to form a T-shaped bar in cross section, the leg 13 of the T having sides 14 and a bottom edge or pressure face 16. The bar 10 is formed of iron, steel, or any suitable metal having good heat conducting characteristics and is of substantial mass to give it substantial heat capacity. The bar 10 is transversely drilled at spaced points for the reception of fastening elements to be described.

An electric heating element 18 of the resistance type and of adequate capacity is securely mounted or embedded in the elongated bore 12 so as to readily transmit heat to the entire bar 10 and may be provided with electrical terminals 20. Thus, upon energization of the resistance element 18, a bonding or sealing temperature of 500° F., or more, is supplied to the pressure face 16.

In order to confine the bond to the area desired and to prevent extrusion of the plastic material of the film under the bonding pressure of the face 16, it is desirable that the leg 13 of the bar 10 be the inner layer of a sandwich structure having outer layers 22 of insulation material. Any of a number of insulating materials such as silicone glass-cloth laminates, asbestos board, etc. may be used and a layer is mounted on each side 14 of the leg 13 along the length of the bar 10 by fastening devices such as the nuts and bolts 24.

Upon assembly of the sandwich structure comprising the leg 13 and the insulating layers 22, the entire assembly is machined so as to give the lower face of this sandwich including the pressure face 16, a very smooth working surface. This extention of the face 16 serves the essential purpose of preventing the hot-bar 10 when under pressure from extruding into the thermoplastic film or distorting it. This is due to the fact that the area of the bond is confined under pressure by the two insulation portions of the lower face of the sandwich which are flush with and bordering the pressure face 16.

In order to prevent the pressure face 16 from adhering to the surface of the thermoplastic film being bonded, a buffer sheet 26 is placed between the pressure surface of the sandwich structure and the thermoplastic film plies being bonded. This may be attached to the hot-bar 10 or to the supporting structure thereof. The thermoplastic film during bonding is supported on a flexible pressure pad or other backing 28 which presses the film against the pressure surface of the sandwich structure to form the clearly defined bond ensured thereby.

In operation, the hot-bar 10 and hence the pressure face 16 is brought to the desired temperature by energizing the resistance element 18. The pressure face of the sandwich structure is then brought into pressure engagement through the buffer sheet 26 with the thermoplastic films or plies thereof to be bonded. The heat of the hot-bar 10 is conducted to the film which becomes fluid in the region of the pressure face 16 and the films are fused together under pressure.

The buffer sheet 26 remains in contact with the film to be sealed momentarily after the bond. This allows the bond to be raised and the film to be cooled momentarily while beneath the buffer sheet. The buffer sheet then is raised and the bond is completely cooled.

It will now be readily apparent that the sandwich structure described enables the hot-bar 10 to effectively and strongly bond many thermoplastic films which otherwise could not be sealed with an ordinary hot-bar. The hot-bar 10 not only enables the sealing of all types of thermoplastic films but also produces a very high quality seal which is unobtainable without the novel sandwich structure.

It is to be understood that the form of my invention herewith shown and described is to be taken as a preferred example of the same and that various changes in the shape size and arrangement of parts may be resorted to without departure from the spirit of the invention or the scope of the subjoined claims.

I claim:
1. A hot bar for heat bonding thermoplastic film comprising first and second integrated body portions of heat conducting material, heating means in said first body portion, a flat pressure face on the free end of said second body portion, heat limiting means removably and solely attached to said second body portion adjacent each side of said pressure face for limiting the bonding heat to the area of said pressure face, said pressure face and the ends of said heat limiting means being flush and forming a continuous flat smooth working face.

2. A hot bar for heat bonding thermoplastic film as claimed in claim 1, said first body portion being exposed and said second body portion being substantially narrower than said first body portion, said heat limiting means being secured on each longitudinal side of said second body portion and extending up to and in abutment with the end face of said first body portion.

3. A hot bar for heat bonding thermoplastic film as in 2, electric heating means in said first body portion and said heat limiting means consisting of insulating material.

4. A hot bar for heat bonding thermoplastic film as in 1, and including a buffer bar extending across the pressure face and the ends of said heat limiting means and adapted for interposition between said hot bar and thermoplastic film to be bonded.

References Cited in the file of this patent

UNITED STATES PATENTS

| | | |
|---|---|---|
| 2,401,991 | Walton et al. | June 11, 1946 |
| 2,481,554 | Winstead | Sept. 13, 1949 |
| 2,552,259 | Collins et al. | May 8, 1951 |
| 2,574,095 | Langer | Nov. 6, 1951 |
| 2,581,977 | Spalding et al. | Jan. 8, 1952 |
| 2,596,933 | Kirk | May 13, 1952 |
| 2,606,987 | Winstead | Aug. 12, 1952 |
| 2,625,201 | Smith | Jan. 13, 1953 |
| 2,651,350 | Casey | Sept. 8, 1953 |